(12) United States Patent
Teraue (10) Patent No.: US 8,947,739 B2
(45) Date of Patent: Feb. 3, 2015

(54) PRINTING CONDITION SETTING APPARATUS, PRINTING CONDITION SETTING METHOD, AND NON-TRANSITORY STORAGE MEDIUM

(71) Applicant: FUJIFILM Corporation, Tokyo (JP)

(72) Inventor: Eiji Teraue, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/150,205

(22) Filed: Jan. 8, 2014

(65) Prior Publication Data
US 2014/0192371 A1 Jul. 10, 2014

(30) Foreign Application Priority Data

Jan. 9, 2013 (JP) ................................. 2013-001887

(51) Int. Cl.
H04N 1/50 (2006.01)
H04N 1/60 (2006.01)
G06K 15/02 (2006.01)

(52) U.S. Cl.
CPC ........ *G06K 15/1878* (2013.01); *G06K 15/1868* (2013.01); *H04N 1/60* (2013.01)
USPC ............................. 358/3.24; 358/504; 358/518

(58) Field of Classification Search
None
See application file for complete search history.

(56) References Cited

U.S. PATENT DOCUMENTS

| 6,943,917 | B2 * | 9/2005 | Tamagawa | 358/504 |
|-----------|------|--------|----------|---------|
| 6,999,200 | B2 * | 2/2006 | Shiraishi | 358/504 |
| 7,160,040 | B2 * | 1/2007 | Matsushima | 358/1.9 |
| 7,417,763 | B2 * | 8/2008 | Saito | 358/504 |
| 8,842,335 | B2 * | 9/2014 | Yamaguchi | 358/1.9 |
| 2005/0117926 | A1 * | 6/2005 | Tanaka et al. | 399/49 |
| 2005/0200866 | A1 * | 9/2005 | Hoshii et al. | 358/1.9 |
| 2010/0110460 | A1 * | 5/2010 | Miyata | 358/1.9 |
| 2010/0328688 | A1 | 12/2010 | Sakamoto et al. | |

FOREIGN PATENT DOCUMENTS

| JP | 2005-176003 A | 6/2005 |
| JP | 2010-147609 A | 7/2010 |
| JP | 2011-9920 A | 1/2011 |

* cited by examiner

*Primary Examiner* — Scott A Rogers
(74) *Attorney, Agent, or Firm* — Birch, Stewart, Kolasch & Birch, LLP (57) ABSTRACT

Color conversion conditions corresponding to medium types belonging to the same group as a selected representative type are collectively updated based on calibration results. It is judged whether or not there is a fluctuating factor concerning color reproduction characteristics between a print medium that is used at present in the calibration and a print medium that was used in the past. If a fluctuating factor is determined to exist, then only the color converting condition corresponding to the representative type is updated.

9 Claims, 6 Drawing Sheets

PRINTING CONDITION SETTING APPARATUS, PRINTING CONDITION SETTING METHOD, AND NON-TRANSITORY STORAGE MEDIUM

CROSS-REFERENCE TO RELATED APPLICATION

This application is based upon and claims the benefit of priority from Japanese Patent Application No. 2013-001887 filed on Jan. 9, 2013, the contents of which are incorporated herein by reference.

BACKGROUND OF THE INVENTION

1. Field of the Invention

The present invention relates to a printing condition setting apparatus, a printing condition setting method, and a non-transitory storage medium for setting color conversion conditions for respective types of print mediums.

2. Description of the Related Art

Heretofore, it has been customary for the steady production of prints of stable quality, which suffer from minimum color fluctuations, to have a calibration process appropriately carried out by respective printers. Recently, digitization of printing workflows has become so popular that a color matching technology based on color profiles (hereinafter also referred to as "profiles") is in widespread use.

In the case that prints are produced by a single printing apparatus, if the prints are formed on different types of print mediums (hereinafter also referred to as "medium types"), then the prints may have significantly different color reproduction characteristics. In other words, for strict color precision management, it is necessary to generate and prepare as many profiles as the number of medium types involved. However, it is tedious and time-consuming for the operator to fulfill such a task.

To alleviate the aforementioned shortcomings, Japanese Laid-Open Patent Publication No. 2011-009920, Japanese Laid-Open Patent Publication No. 2010-147609, and Japanese Laid-Open Patent Publication No. 2005-176003 have various proposed setting methods in which a plurality of medium types are grouped together, and a calibration result is reflected on a medium type in the remaining other medium types of the group, thereby reducing the number of calibration process steps, or more specifically, the number of calibrations that need to be carried out. Japanese Laid-Open Patent Publication No. 2005-176003 states in paragraph [0031] that problems do not arise out of assuming representative color reproduction characteristics for print mediums that have similar color reproduction characteristics.

SUMMARY OF THE INVENTION

According to a study conducted by the inventor of the present invention, it has been found that even print mediums under the same brand have significantly different color reproduction characteristics, if the print mediums have different production lot numbers or have different elapsed times due to the production thereof. The setting methods disclosed in Japanese Laid-Open Patent Publication No. 2011-009920, Japanese Laid-Open Patent Publication No. 2010-147609, and Japanese Laid-Open Patent Publication No. 2005-176003 do not take into consideration the above problems. If the disclosed setting methods are applied without modification, then the color reproduction characteristics of prints based on the remaining medium types may possibly be impaired.

It is an object of the present invention to provide a printing condition setting apparatus, a printing condition setting method, and a non-transitory storage medium, which are capable of minimizing the number of required calibration process steps, while at the same time maintaining a desired level of color precision management for a print regardless of the type of print medium used.

According to the present invention, there is provided a printing condition setting apparatus for setting color conversion conditions for respective types of print mediums on which an image is produced with a printing apparatus, comprising a representative type selector for selecting a representative type to be used in a calibration on the printing apparatus from among two or more medium types that have been classified into a group, a color conversion condition updater for collectively updating color conversion conditions corresponding to the medium types belonging to the same group as the representative type selected by the representative type selector, based on a result of the calibration, and a fluctuating factor determiner for judging whether or not there is a fluctuating factor concerning color reproduction characteristics between a print medium that is used at present in the calibration and a print medium that was used in the past, wherein the color conversion condition updater updates only the color conversion condition corresponding to the representative type if the fluctuating factor determiner determines that the fluctuating factor exists.

Since the color conversion condition updater collectively updates color conversion conditions, which correspond to medium types belonging to the same group as the selected representative type, based on the calibration results, the calibration may be carried out only once for one group of medium types. The fluctuating factor determiner judges whether or not there is a fluctuating factor concerning color reproduction characteristics between a print medium that is used at present in the calibration and a print medium that was used in the past. Further, if the fluctuating factor determiner determines that a fluctuating factor exists, only the color converting condition corresponding to the representative type is updated. Consequently, calibration results containing a fluctuating factor concerning color reproduction characteristics are not reflected in the remaining medium types. In other words, carrying out the calibration does not tend to impair the color reproduction characteristics of the prints on the print mediums of the remaining medium types. Therefore, it is possible to minimize the number of required calibration process steps, while at the same time maintaining a desired level of color precision management for the print, regardless of the type of print medium that is used.

Preferably, the fluctuating factor determiner judges that the fluctuating factor exists if a color difference between bases of the print mediums is greater than a threshold value.

Preferably, the fluctuating factor determiner judges whether or not the fluctuating factor exists depending on a combination of production lot information of the print medium that is used at present in the calibration and the print medium that was used in the past.

Preferably, the printing condition setting apparatus further comprises a calibration prompter for prompting an operator to carry out the calibration individually using remaining medium types belonging to the same group as the representative type if the fluctuating factor determiner determines that the fluctuating factor exists.

According to the present invention, there is also provided a printing condition setting method to be carried out by a printing condition setting apparatus for setting color conversion conditions for respective types of print mediums on which an image is produced with a printing apparatus, comprising the steps of selecting a representative type to be used in a calibration on the printing apparatus from among two or more medium types that have been classified into a group, collectively updating color conversion conditions corresponding to the medium types belonging to the same group as the selected representative type, based on a result of the calibration, and judging whether or not there is a fluctuating factor concerning color reproduction characteristics between a print medium that is used at present in the calibration and a print medium that was used in the past, wherein the steps are carried out by the printing condition setting apparatus, and wherein the step of collectively updating color conversion conditions updates only the color conversion condition corresponding to the representative type if the step of judging determines that the fluctuating factor exists.

Preferably, the step of judging judges that the fluctuating factor exists if a color difference between bases of the print mediums is greater than a threshold value.

Preferably, the step of judging judges whether or not the fluctuating factor exists, depending on a combination of production lot information of the print medium that is used at present in the calibration and the print medium that was used in the past.

Preferably, the printing condition setting method further comprises the step of prompting an operator to carry out the calibration individually using remaining medium types belonging to the same group as the representative type if the step of judging determines that the fluctuating factor exists.

According to the present invention, there is further provided a non-transitory storage medium storing therein a program for setting color conversion conditions for respective types of print mediums on which an image is produced with a printing apparatus, the program enabling a computer to carry out the steps of selecting a representative type to be used in a calibration on the printing apparatus from among two or more medium types that have been classified into a group, collectively updating color conversion conditions corresponding to the medium types belonging to the same group as the selected representative type, based on a result of the calibration, and judging whether or not there is a fluctuating factor concerning color reproduction characteristics between a print medium that is used at present in the calibration and a print medium that was used in the past, wherein the step of collectively updating color conversion conditions updates only the color conversion condition corresponding to the representative type if the step of judging determines that the fluctuating factor exists.

With the printing condition setting apparatus, the printing condition setting method, and the non-transitory storage medium according to the present invention, since the color conversion conditions, which correspond to the medium types belonging to the same group as the selected representative type, are collectively updated based on the calibration results, the calibration may be carried out only once for one group of medium types. It is judged whether or not there is a fluctuating factor concerning color reproduction characteristics between a print medium that is used at present in the calibration and a print medium that was used in the past. Further, if it is determined that a fluctuating factor exists, only the color converting condition corresponding to the representative type is updated. Consequently, calibration results containing a fluctuating factor concerning color reproduction characteristics are not reflected in the remaining medium types. In other words, carrying out the calibration does not tend to impair the color reproduction characteristics of the prints on the print mediums of the remaining medium types. Therefore, it is possible to minimize the number of required calibration process steps, while at the same time maintaining a desired level of color precision management for the print, regardless of the type of print medium that is used.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A printing condition setting method according to a preferred embodiment of the present invention in relation to a printing condition setting apparatus, a non-transitory storage medium, and a print production system for carrying out the printing condition setting method will be described in detail below with reference to the accompanying drawings.

Configuration of Print Production System 10

Figure 1:
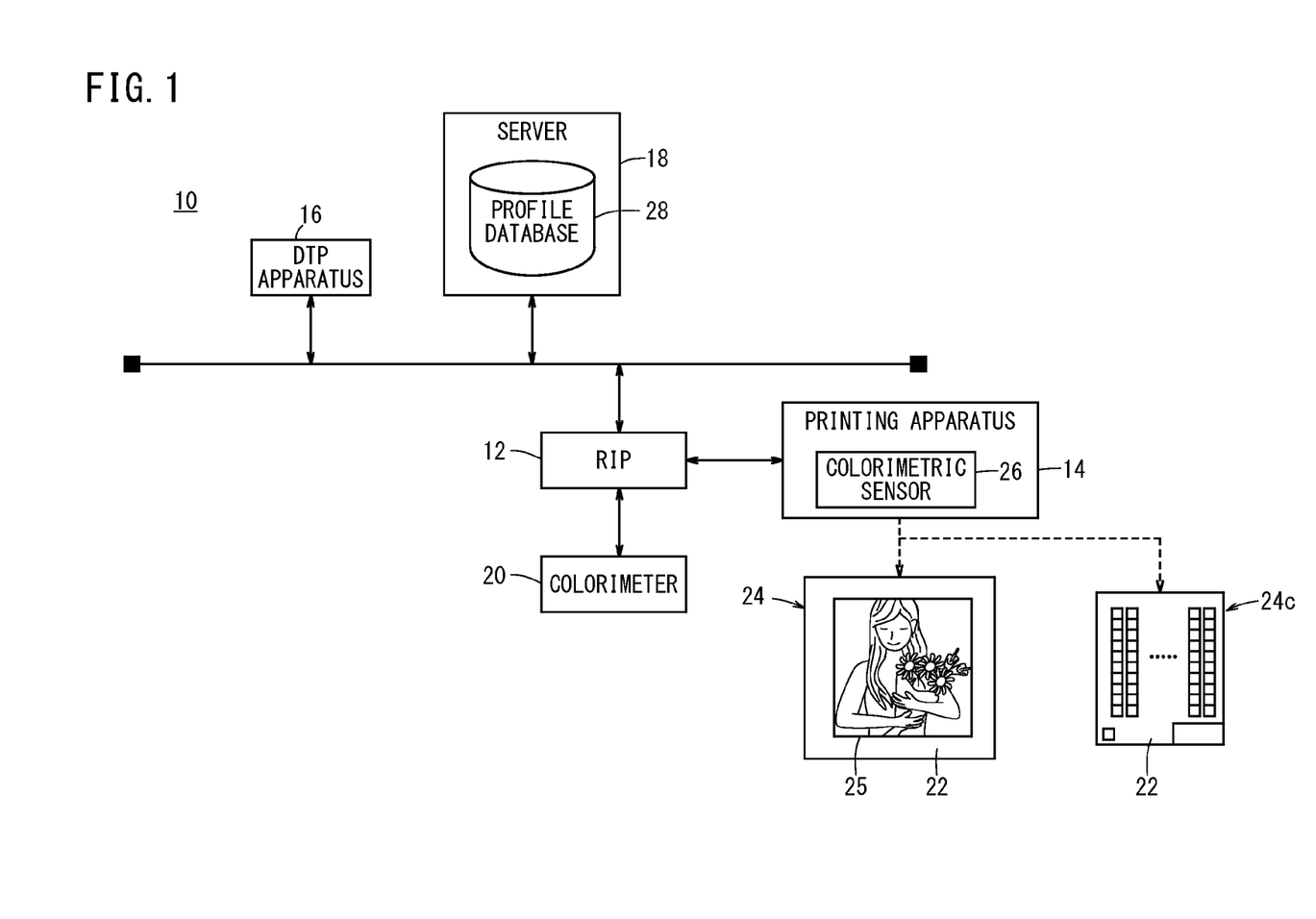
FIG. 1 is a block diagram of a print production system incorporating a raster image processor (RIP) as a printing condition setting apparatus according to an embodiment of the present invention.

FIG. 1 shows in block form a print production system 10 incorporating therein a RIP (Raster Image Processor) 12 as a printing condition setting apparatus according to an embodiment of the present invention.

As shown in FIG. 1, the print production system 10 basically includes, in addition to the RIP 12, a printing apparatus 14, a DTP (DeskTop Publishing) apparatus 16, and a server 18. The RIP 12, the DTP apparatus 16, and the server 18 are connected to each other electrically through a wired or wireless link.

The RIP 12 converts various data (device color signals or page description data) supplied from an external apparatus into device color signals suitable for producing prints on the printing apparatus 14. The device color signals represent image data defined in device-dependent data, which may be raster-format data, such as TIFF (Tagged Image File Format) data, bitmap data, RAW data, or the like, having color channels in four colors of C, M, Y, K or three colors of R, G, B. Alternatively, the device color signals supplied to the printing apparatus 14 may have a unique data format with a desired header added thereto.

A colorimeter 20 for measuring color values of an object to be measured is connected to the RIP 12. The color values include not only tristimulus values X, Y, Z, coordinate values L*, a*, b* of a uniform color space, or the like, but also characteristics of optical physical values with respect to wavelengths, e.g., a spectral radiation distribution, a spectral sensitivity distribution, a spectral reflectance, or a spectral transmittance. Color values acquired by the colorimeter 20 may also be referred to as "colorimetric values".

The printing apparatus 14 is connected electrically to the RIP 12 through a serial interface such as a USB (Universal Serial Bus) cable, an IEEE1394 cable, an Ethernet (registered trademark) cable, a wireless network, or the like, or a parallel interface such as a Centronics cable.

The printing apparatus 14 comprises an apparatus for forming an image on a print medium 22, thereby producing a print 24 (including a color chart 24c). The printing apparatus 14 may comprise an offset press, a proofer, or a digital printer for direct printing. The proofer may comprise a DDCP (Direct Digital Color Proofer), an ink jet color proofer, a low-resolution color laser printer (electrophotographic printer), an ink jet printer, or the like. The digital printer may comprise an ink jet color proofer, a low-resolution color laser printer (electrophotographic printer), or the like.

The print medium 22 has a base, which may comprise a paper medium such as synthetic paper, thick paper, aluminum-evaporated paper, or the like, a resin medium made of vinyl chloride, PET (polyethylene terephthalate), or the like, or tarpaulin paper, or the like. The print 24, which is produced by the printing apparatus 14, includes a finished area 25 that remains as an actual image area after marginal edges thereof have been cropped.

The printing apparatus 14 includes a colorimetric sensor 26 for measuring color values of an object to be measured. The colorimetric sensor 26 has a detection surface that faces toward an image forming surface of the print medium 22. Accordingly, the printing apparatus 14 including the colorimetric sensor 26 is capable of colorimetrically measuring a given area of the print medium 22 as the print medium 22 is transported through the printing apparatus 14 by a non-illustrated transporting mechanism.

The DTP apparatus 16 generates electronic manuscripts in a page description language (hereinafter referred to as "PDL") by laying content data made up of characters, figures, photographs, etc., on respective pages. PDL refers to a language, which is descriptive of image information including format information, positional information, color information (including density information), etc., of characters, figures, etc., in a "page" that serves as an output unit for printing, displaying, or the like.

The server 18 is an apparatus for managing data concerning print jobs. More specifically, the server 18 manages data such as content data, job tickets, e.g., JDF (Job Definition Format) files, color conversion conditions, or color sample data.

The "color conversion conditions" refer to various conditions for converting a supplied image signal into device color signals for printing. The color conversion conditions may comprise not only an ICC (International Color Consortium) profile, but also a LUT (Look Up Table), matrix elements, a function formula, coefficients, various information for constructing a learning model, or any of various combinations thereof.

As shown in FIG. 1, the server 18 includes a profile database 28. The profile database 28 stores target profiles, device profiles such as printing profiles suitable for the printing apparatus 14, or device link profiles.

Configuration of Color Chart 24c

Figure 2:
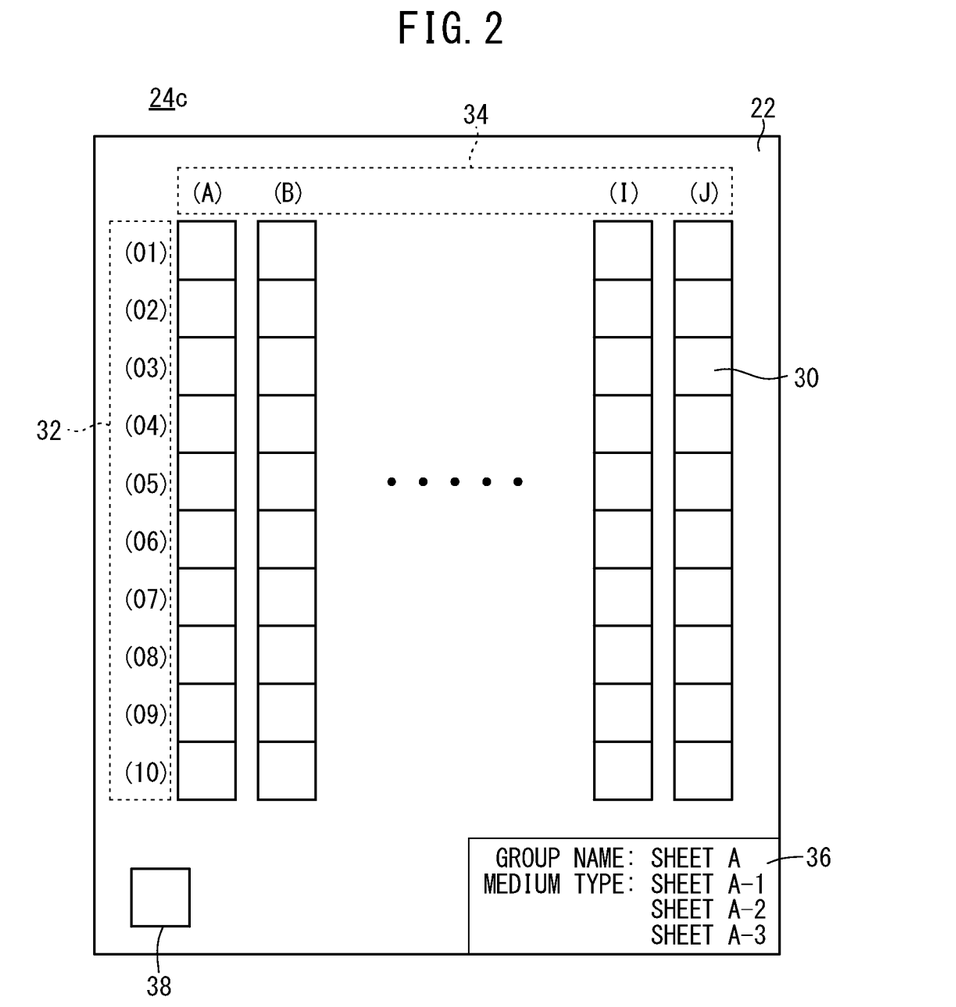
FIG. 2 is a front elevational view of a color chart shown in FIG. 1.

FIG. 2 is a front elevational view of the color chart 24c shown in FIG. 1.

As shown in FIG. 2, the color chart 24c is made up of one hundred color patches 30 having different colors, all of which are printed on the print medium 22 and are essentially identical in shape, a numeral string 32 for identifying rows of color patches 30, an alphabetical letter string 34 for identifying columns of color patches 30, an information field 36 printed with information concerning the type of print medium 22 (hereinafter referred to as a "medium type"), and a colorimetric frame 38 for identifying a colorimetric area on the print medium 22.

The color patches 30 are arranged in vertical columns of ten adjoined color patches, and also arranged in horizontal rows of ten spaced color patches. The colors of the color patches 30 are set to given values in a range of signal levels of C, M, Y, K, i.e., in a range from 0% to 100%, or a gradation range of 8-bit image data from a gradation level of 0 to a gradation level of 255.

The numeral string 32 includes a downward array of numerals (01) through (10) positioned on the left side of the color patches 30 in alignment with respective horizontal rows of the color patches 30. The alphabetical letter string 34 includes a rightward array of alphabetical letters (A) through (J) positioned on the upper side of the color patches 30 in alignment with respective vertical columns of the color patches 30.

The information field 36 includes information concerning the print medium 22, e.g., a group name and medium types belonging to the group name. The colorimetric frame 38 surrounds a rectangular area corresponding to a base area (unprinted area) of the print medium 22.

Configuration of RIP 12

Figure 3:
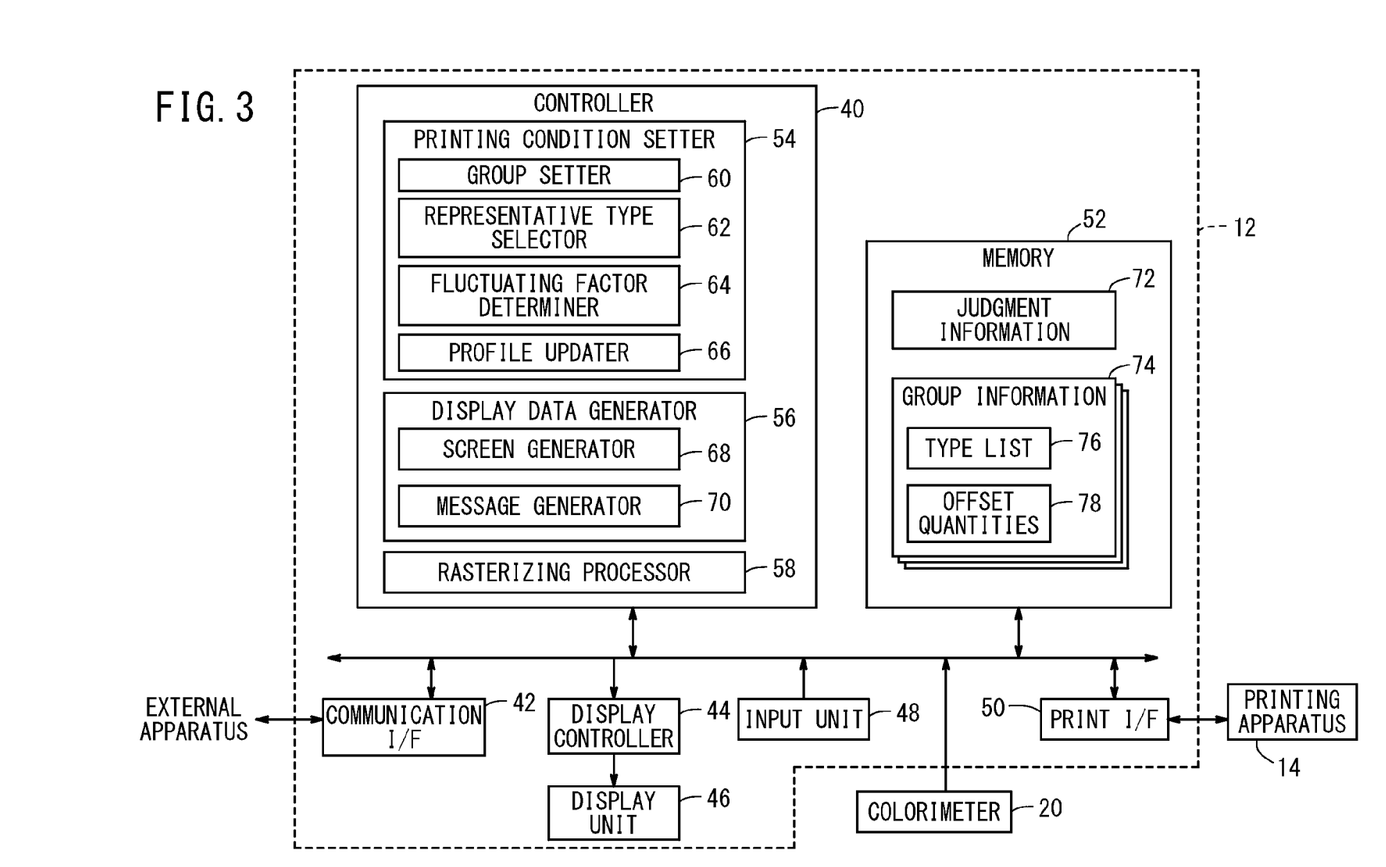
FIG. 3 is an electric block diagram of the RIP shown in FIG. 1.

FIG. 3 is an electric block diagram of the RIP 12 shown in FIG. 1. As shown in FIG. 3, the RIP 12 comprises a computer that includes a controller 40, a communication I/F 42, a display controller 44, a display unit 46, an input unit 48, a print I/F 50, and a memory 52 (storage medium).

The communication I/F 42 comprises an interface for sending electric signals to and receiving electric signals from external apparatus. For example, the communication I/F 42 can acquire various items of information such as proof data, platemaking data, profiles, etc., which are managed and saved in the server 18 (see FIG. 1).

The display controller 44 comprises a control circuit for controlling the display unit 46 under the control of the controller 40. More specifically, in case where the display controller 44 outputs a display control signal to the display unit 46 via an I/F (not shown), the display unit 46 is energized to display various images including a window W1 (FIG. 5) and a window W2 (FIGS. 6A and 6B).

The input unit 48 comprises various input devices including a mouse, a trackball, a keyboard, a touch sensor, etc. The display function of the display unit 46 and the input function of the input unit 48 are combined into a user interface.

The print I/F 50 comprises an interface for sending electric signals representing print data to the printing apparatus 14, and for enabling the printing apparatus 14 to produce the print 24 including the color chart 24c.

The memory 52 stores programs and data, which are required for the controller 40 to control various components of the RIP 12. The memory 52 may comprise a computer-readable non-transitory storage medium, which may be a portable medium such as a magnetooptical disk, a ROM, a CD-ROM, a flash memory, or the like, or a storage device such as a hard disk incorporated in a computer system. The storage medium may be capable of holding programs dynamically for a short period of time, or may hold the programs for a prescribed period of time.

The controller 40 comprises a processor such as a CPU (Central Processing Unit). The controller 40 reads and executes programs stored in the memory 52 in order to carry out functions of a printing condition setter 54, a display data generator 56, and a rasterizing processor 58.

The printing condition setter 54 sets printing conditions including profiles for each of respective print jobs that are carried out. More specifically, the printing condition setter 54 includes a group setter 60 for setting a group of two or more medium types, a representative type selector 62 for selecting a representative type of medium from among the two or more medium types, a fluctuating factor determiner 64 for determining whether or not there is a fluctuating factor concerning color reproduction characteristics, and a profile updater 66 (color conversion condition updater) for collectively or individually updating profiles that serve as color conversion conditions depending on calibration results.

The display data generator 56 includes a screen generator 68 for generating a setting screen 80 (see FIG. 5) for use in setting profiles, and a message generator 70 for generating various messages including a prompt message 118 (see FIG. 6B) to prompt the user to perform an additional calibration.

The rasterizing processor 58 performs a rasterizing process on page description data in order to generate print data that represent an image form of the print 24. The rasterizing process includes a data format conversion process for converting a PDL format into a raster format, and a color matching process using profiles.

Operation of RIP 12

The RIP 12, which serves as a printing condition setting apparatus according to the present embodiment, is configured as described above. Operations of the RIP 12 for setting a calibration (including a "collective setting") will be described below with reference to the flowchart shown in FIG. 4.

According to the present embodiment, calibration (color calibration) is a concept that covers not only regeneration of profiles, but also correction of color conversion LUTs (tone curves). The term "collective setting" refers to a setting process that classifies print mediums 22 having highly correlated color reproduction characteristics into a group, and reflects the calibration results using a representative type of print medium 22 for the remaining other types of print mediums 22.

Figure 4:
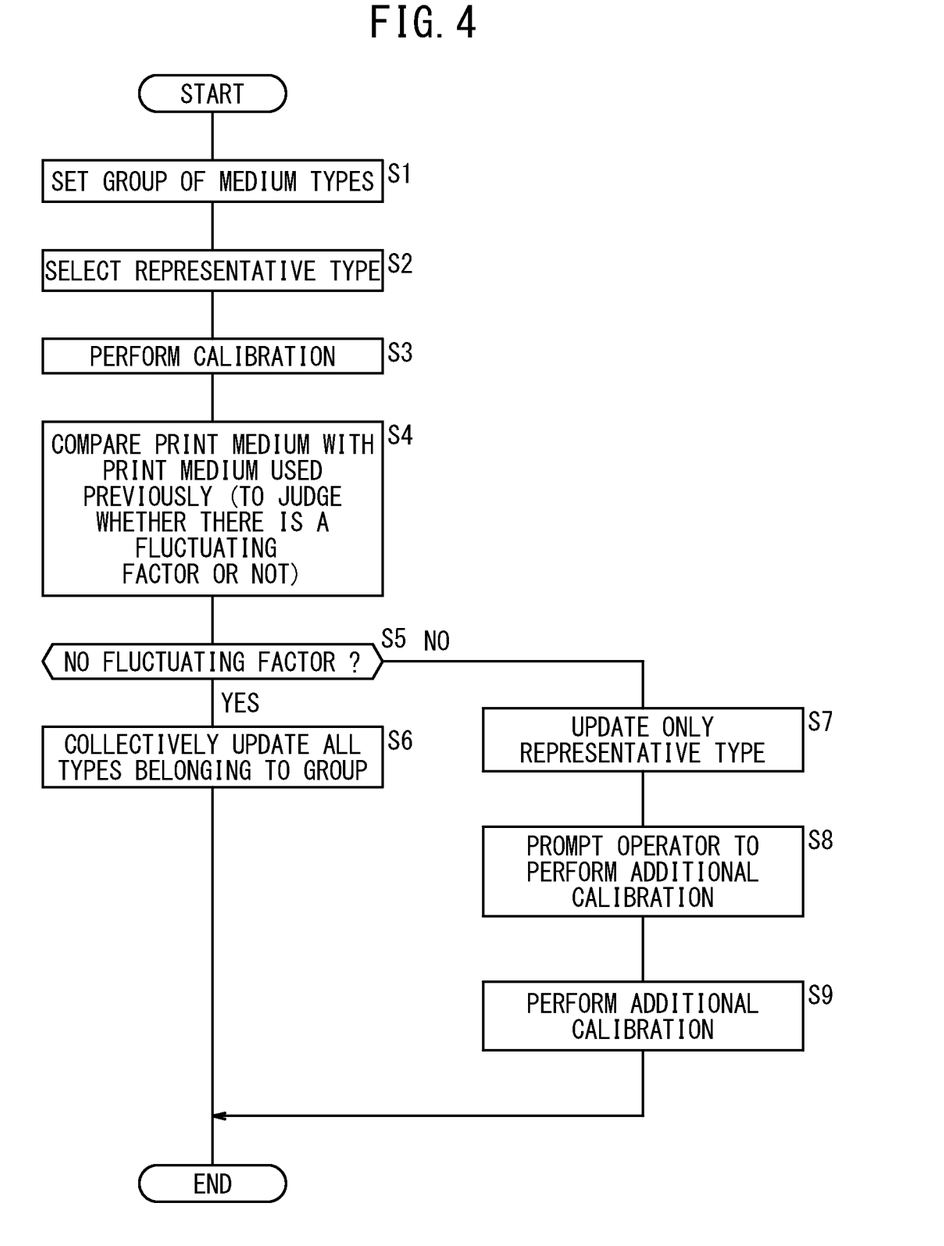
FIG. 4 is a flowchart of an operation sequence of the RIP shown in FIGS. 1 and 3.

In step S1 of FIG. 4, the group setter 60 sets a group of two or more medium types from among a plurality of medium types. More specifically, the group setter 60 classifies medium types, the color reproduction characteristics of which on prints 24 are highly correlated, and the color prediction precision levels of which are relatively high, into a group. In the following description, it is assumed that the group setter 60 classifies three medium types, i.e., "SHEET A-1", "SHEET A-2", and "SHEET A-3", into a group under the name "SHEET A".

In step S2, the representative type selector 62 selects a representative type from among two or more medium types that belong to the group set in step S1. The term "representative type" refers to a type of print medium 22 on which the color chart 24c is printed and actually measured colorimetrically. In other words, the term "representative type" refers to a medium type that is used in a calibration performed on the printing apparatus 14. In the following description, it is assumed that the medium type "SHEET A-1" is selected as the representative type from among the medium types "SHEET A-1", "SHEET A-2", and "SHEET A-3".

Then, the controller 40 stores group information 74 concerning the group "SHEET A" in the memory 52. The group information 74 includes a type list 76 representing the group name and a list of medium types that belong to the group, and offset quantities 78 of the color reproduction characteristics of the remaining medium types with respect to the color reproduction characteristics of the representative type.

In step S3, the RIP 12 performs a calibration using the print medium 22 of the representative type, which was selected in step S2. Prior to performing the calibration, the RIP 12 displays a setting screen 80 (see FIG. 5) for use in setting profiles. More specifically, in response to an instruction to start setting profiles, the display data generator 56 generates display data for the setting screen 80, and supplies the generated display data to the display controller 44. The display controller 44 controls the display unit 46 to display a window W1 including the setting screen 80 shown in FIG. 5.

Figure 5:
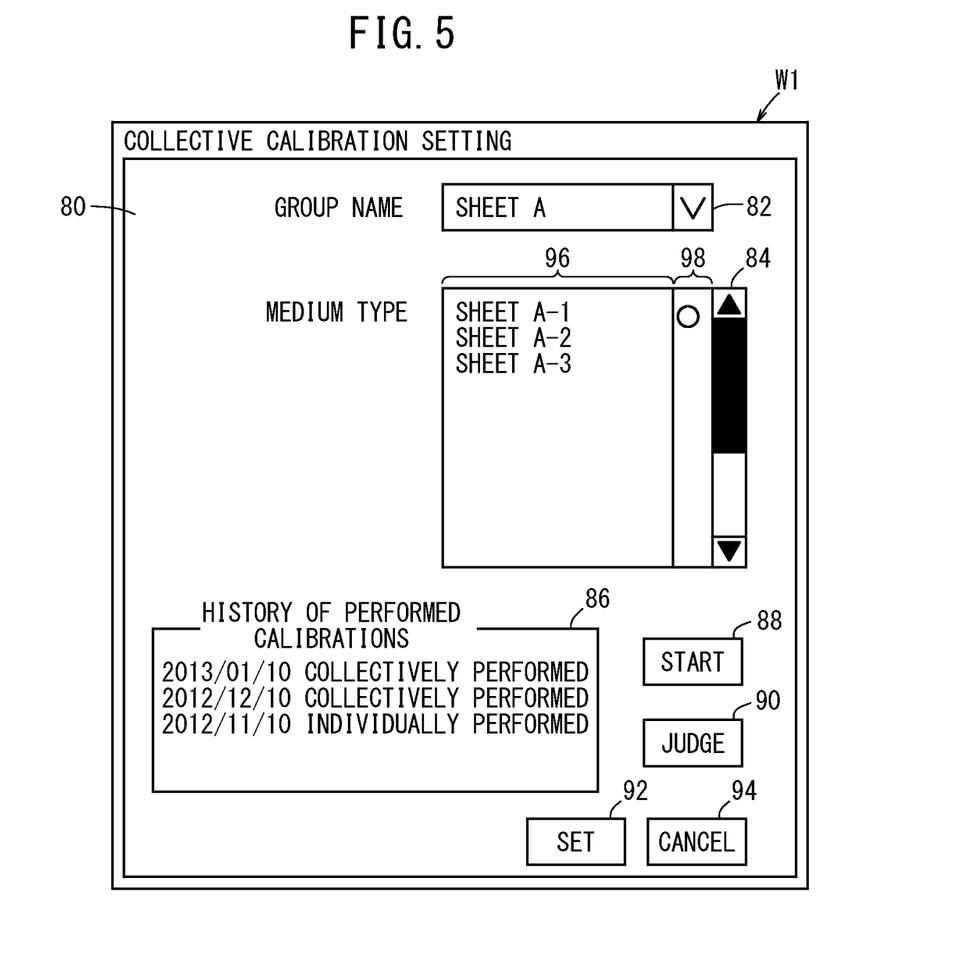
FIG. 5 is a view of an image showing a setting screen by way of example.
Figure 6A:
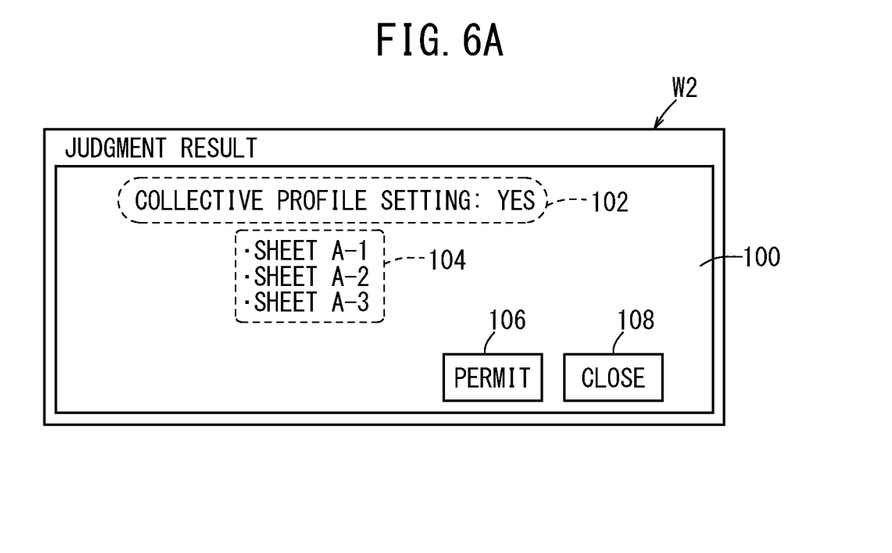
FIGS. 6A and 6B are views of images showing judgment result screens by way of example.
Figure 6B:
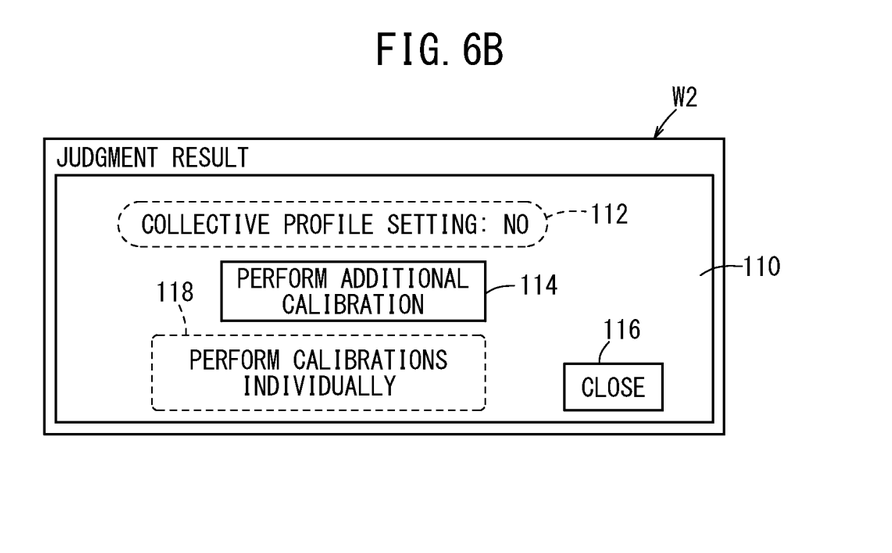

As shown in FIG. 5, the setting screen 80 includes a group selection field 82, a first display field 84, a second display field 86, buttons 88, 90 labeled "START" and "JUDGE", respectively, and buttons 92, 94 labeled "SET" and "CANCEL", respectively. The first display field 84 is made up of a small field 96 indicating a list of medium types that belong to the group name indicated by the group selection field 82, and a small field 98 including a mark (the circular dot in FIG. 5) that specifies the representative type. The second display field 86 indicates a history of calibrations (dates and updating processes) that have been performed.

The operator, who is a user of the print production system 10, sets "SHEET A" in the group selection field 82, and then clicks on the "START" button 88. In response to the operator clicking on the "START" button 88, the controller 40 of the RIP 12 initiates a calibration process using the print medium 22, which is of the representative type "SHEET A-1". For example, the controller 40 instructs the printing apparatus 14 to produce the color chart 24c (FIG. 2), and acquires colorimetric values of the color patches 30 from the colorimeter 20.

Thereafter, in response to the operator clicking on the "JUDGE" button 90, control proceeds to step S4.

In step S4, the fluctuating factor determiner 64 judges whether or not there is a fluctuating factor concerning color reproduction characteristics by comparing the print medium 22 with a print medium 22 that has been used previously. A specific judgment process will be described below.

There are two fluctuating factors concerning color reproduction characteristics, i.e., a first fluctuating factor and a second fluctuating factor.

The first fluctuating factor relates to the production lot of the print medium 22. Even if two or more print mediums 22 are manufactured under the same brand, the print mediums 22 may have different color reproduction characteristics if the print mediums 22 have different production lot numbers. The fluctuating factor determiner 64 is capable of judging whether or not there is a fluctuating factor between the print mediums 22, based on a combination of the production lot information of the print mediums 22.

For example, the memory 52 stores judgment information 72 (see FIG. 3) representing a relationship between a combination of the production lot information of the print mediums 22 and similarities (whether there is a fluctuating factor or not) in the color reproduction characteristics of the print mediums 22. The fluctuating factor determiner 64 reads the judgment information 72 from the memory 52, and by referring to the judgment information 72, determines whether or not there is a fluctuating factor between the print medium 22 used at present and a print medium 22 that was used in the past.

The second fluctuating factor relates to how the print medium 22 has been stored after production thereof. For example, a print medium 22, which has not yet been used, may have color reproduction characteristics on the print 24 changed, i.e., deteriorated, depending on the conditions under which the print medium 22 was stored after production thereof, and the number of days that have elapsed after the print medium 22 was produced. The fluctuating factor determiner 64 may judge whether or not there is a fluctuating factor based on any change in the color of the base of the print medium 22.

For example, in case where the printing apparatus 14 shown in FIG. 1 is operated to print the color chart 24c, while the print medium 22 is being transported through the printing apparatus 14, the printing apparatus 14 acquires colorimetric values of the base on the print medium 22 that resides within the colorimetric frame 38 (FIG. 2) from the colorimetric sensor 26, and supplies the acquired colorimetric values to the RIP 12. Thereafter, the fluctuating factor determiner 64 calculates a color difference between colorimetric values of the print medium 22 that is being used at present and colorimetric values of a print medium 22 that was used in the past. If the calculated color difference between the colorimetric values of the bases of the print mediums 22 is greater than a threshold value, then the fluctuating factor determiner 64 determines that a fluctuating factor exists. If the calculated color difference is equal to or smaller than the threshold value, then the fluctuating factor determiner 64 determines that a fluctuating factor does not exist.

Aside from the above-described judgment process, the fluctuating factor determiner 64 may judge whether or not a fluctuating factor exists using various variables or judgment formulas. The fluctuating factor determiner 64 is not required to compare the print medium 22 with a print medium 22 processed in a preceding calibration, but may compare the print medium 22 with a print medium 22 processed in a calibration prior to the preceding calibration, or with a print medium 22 determined based on statistical values from calibrations carried out in the past.

In step S5, if the fluctuating factor determiner 64 determines that a fluctuating factor does not exist concerning color reproduction characteristics between the print mediums 22 (step S5: YES), then the RIP 12 displays a judgment result screen 100 shown in FIG. 6A. Before the judgment result screen 100 is displayed, the message generator 70 generates a judgment message 102, which indicates that profiles can be set collectively. The display data generator 56 generates display data representing the judgment result screen 100 including the judgment message 102, and then supplies the generated display data to the display controller 44. The display controller 44 controls the display unit 46 to display a window W2 that includes the judgment result screen 100.

As shown in FIG. 6A, the judgment result screen 100 includes the judgment message 102, ancillary information 104, and buttons 106, 108 labeled "PERMIT" and "CLOSE", respectively. The judgment message 102 is represented by the letter string "COLLECTIVE PROFILE SETTING: YES". The ancillary information 104 shows three medium types that are to be collectively updated, which are the same as the medium types shown in the small field 96 in FIG. 5.

It is assumed that the operator has observed the judgment message 102 and has permitted, i.e., enabled, collective calibration setting. In response to the operator clicking on the "PERMIT" button 106, control proceeds to step S6.

In step S6, the profile updater 66 collectively updates profiles of all of the medium types that belong to the same group as the representative type. More specifically, the profile updater 66 adds the offset quantities 78 read from the memory 52 to the color conversion table obtained in step S3, thereby producing color conversion tables (profiles) corresponding to the medium types registered in the type list 76.

If the fluctuating factor determiner 64 judges that there is a fluctuating factor concerning color reproduction characteristics between the print mediums 22 (step S5: NO), then control proceeds to step S7.

In step S7, the profile updater 66 updates the profiles of only the representative type. In other words, the profile updater 66 does not update color conversion tables (profiles) that belong to the remaining medium types.

In step S8, the RIP 12 displays a judgment result screen 110 shown in FIG. 6B in order to prompt the operator to carry out additional calibrations. Before the judgment result screen 110 is displayed, the message generator 70 generates a judgment message 112, which indicates that profiles cannot be set collectively. Then, similar to step S6, the display controller 44 controls the display unit 46 to display a window W2 that includes the judgment result screen 110.

As shown in FIG. 6B, the judgment result screen 110 includes the judgment message 112, buttons 114, 116 labeled "PERFORM ADDITIONAL CALIBRATION" and "CLOSE", respectively, and a prompt message 118. The judgment message 112 is represented by the letter string "COLLECTIVE PROFILE SETTING: NO". The prompt message 118 is represented by the letter string "PERFORM CALIBRATIONS INDIVIDUALLY".

At this time, the display unit 46 functions as a calibration prompter for prompting the operator to perform calibrations individually using the remaining medium types, which belong to the same group as the representative type. As the calibration prompter, a lamp, a buzzer, a speaker, or a combination thereof, for example, may be used instead of the display unit 46, insofar as such devices are capable of informing and prompting the operator.

It is assumed that the operator has observed the judgment message 112 and has agreed to perform calibrations individually. In response to the operator clicking on the "PERFORM ADDITIONAL CALIBRATION" button 114, control proceeds to step S9.

In step S9, the RIP 12 performs additional calibrations individually using the print mediums 22 of the remaining medium types except for the representative type. For example, the controller 40 of the RIP 12 instructs the display unit 46 to display guidance concerning loading of a print medium 22, further instructs the printing apparatus 14 to produce a color chart 24c, and acquires from the colorimeter 20 colorimetric values of respective color patches of the color chart 24c.

Operations of the RIP 12 with respect to setting of calibrations are now finished. In response to the operator clicking on the "SET" button 92 (FIG. 5), the RIP 12 may send new profiles to the server 18 in order to update the data stored in the profile database 28 (FIG. 1).

Various items of information concerning the print medium 22 may be stored in the server 18, and may be used in the selection process (step S2 in FIG. 4) or the judgment process (step S4 in FIG. 4) during subsequent operation cycles. The representative type selector 62 may select, as a representative type, one of the two or more medium types belonging to one group, the color reproduction characteristics of which are closest to an average of the color reproduction characteristics of the medium types.

Advantages of the Invention

As described above, the RIP 12 includes the representative type selector 62, which selects a representative type, which is used in the calibration on the printing apparatus 14, from among two or more medium types that have been classified into a group, the profile updater 66, which collectively updates profiles corresponding to the medium types belonging to the same group as the selected representative type, based on the results of the calibration, and the fluctuating factor determiner 64, which judges whether or not there is a fluctuating factor concerning color reproduction characteristics between a print medium 22 that is used at present in the calibration and a print medium 22 that was used in the past.

Since the profile updater 66 collectively updates profiles corresponding to medium types that belong to the same group as the selected representative type, based on the calibration results, calibration may be carried out only once for one group of medium types. The fluctuating factor determiner 64 judges whether or not there is a fluctuating factor concerning color reproduction characteristics between a print medium 22 that is used at present in the calibration and a print medium 22 that was used in the past. Further, if the fluctuating factor determiner 64 determines that a fluctuating factor exists, only the profile corresponding to the representative type is updated. Consequently, calibration results containing a fluctuating factor concerning color reproduction characteristics are not reflected in the remaining medium types. In other words, carrying out the calibration does not tend to impair the color reproduction characteristics of the prints 24 on the print mediums 22 of the remaining medium types. Therefore, it is possible to minimize the number of required calibration process steps, while at the same time maintaining a desired level of color precision management for the print 24, regardless of the type of print medium 22 that is used.

Although a certain preferred embodiment of the present invention has been shown and described in detail, it should be understood that various changes and modifications may be made to the embodiment without departing from the scope of the invention as set forth in the appended claims.

What is claimed is:

1. A printing condition setting apparatus for setting color conversion conditions for respective types of print mediums on which an image is produced with a printing apparatus, comprising:
    a representative type selector for selecting a representative type to be used in a calibration on the printing apparatus from among two or more medium types that have been classified into a group;
    a color conversion condition updater for collectively updating color conversion conditions corresponding to the medium types belonging to the same group as the representative type selected by the representative type selector, based on a result of the calibration; and
    a fluctuating factor determiner for judging whether or not there is a fluctuating factor concerning color reproduction characteristics between a print medium that is used at present in the calibration and a print medium that was used in the past,
    wherein the color conversion condition updater updates only the color conversion condition corresponding to the representative type if the fluctuating factor determiner determines that the fluctuating factor exists.

2. The printing condition setting apparatus according to claim 1, wherein the fluctuating factor determiner judges that the fluctuating factor exists if a color difference between bases of the print mediums is greater than a threshold value.

3. The printing condition setting apparatus according to claim 1, wherein the fluctuating factor determiner judges whether or not the fluctuating factor exists depending on a combination of production lot information of the print medium that is used at present in the calibration and the print medium that was used in the past.

4. The printing condition setting apparatus according to claim 1, further comprising:
    a calibration prompter for prompting an operator to carry out the calibration individually using remaining medium types belonging to the same group as the representative type if the fluctuating factor determiner determines that the fluctuating factor exists.

5. A printing condition setting method to be carried out by a printing condition setting apparatus for setting color conversion conditions for respective types of print mediums on which an image is produced with a printing apparatus, comprising the steps of:
    selecting a representative type to be used in a calibration on the printing apparatus from among two or more medium types that have been classified into a group;
    collectively updating color conversion conditions corresponding to the medium types belonging to the same group as the selected representative type, based on a result of the calibration; and
    judging whether or not there is a fluctuating factor concerning color reproduction characteristics between a print medium that is used at present in the calibration and a print medium that was used in the past,
    wherein the steps are carried out by the printing condition setting apparatus, and
    wherein the step of collectively updating color conversion conditions updates only the color conversion condition corresponding to the representative type if the step of judging determines that the fluctuating factor exists.

6. The printing condition setting method according to claim 5, wherein the step of judging judges that the fluctuating factor exists if a color difference between bases of the print mediums is greater than a threshold value.

7. The printing condition setting method according to claim 5, wherein the step of judging judges whether or not the fluctuating factor exists depending on a combination of production lot information of the print medium that is used at present in the calibration and the print medium that was used in the past.

8. The printing condition setting method according to claim 5, further comprising the step of:
    prompting an operator to carry out the calibration individually using remaining medium types belonging to the same group as the representative type if the step of judging determines that the fluctuating factor exists.

9. A non-transitory storage medium storing therein a program for setting color conversion conditions for respective types of print mediums on which an image is produced with a printing apparatus, the program enabling a computer to carry out the steps of:
    selecting a representative type to be used in a calibration on the printing apparatus from among two or more medium types that have been classified into a group;
    collectively updating color conversion conditions corresponding to the medium types belonging to the same group as the selected representative type, based on a result of the calibration; and
    judging whether or not there is a fluctuating factor concerning color reproduction characteristics between a print medium that is used at present in the calibration and a print medium that was used in the past, wherein the step of collectively updating color conversion conditions updates only the color conversion condition corresponding to the representative type if the step of judging determines that the fluctuating factor exists.

* * * * *